May 10, 1960   M. G. J. BEETS ET AL   2,936,310
PROCESS OF PREPARING MACROCYCLIC LACTONES
Filed June 6, 1955
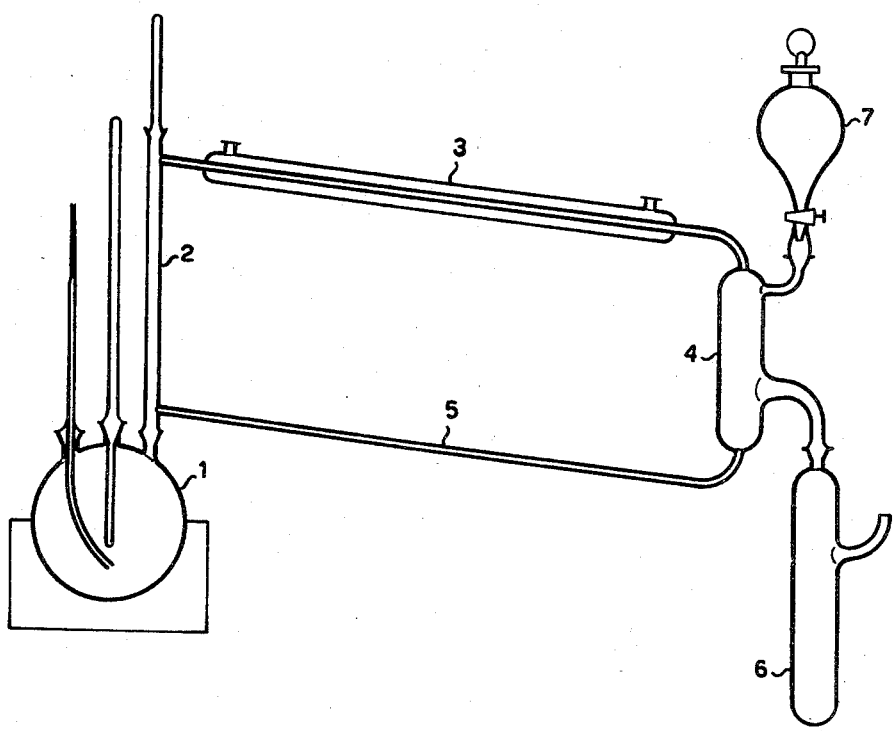
INVENTOR.
Muus G.J. BEETS & Harm VAN ESSEN
BY  A. John Michel
ATTORNEY

United States Patent Office 2,936,310
Patented May 10, 1960

2,936,310

PROCESS OF PREPARING MACROCYCLIC LACTONES

Muus G. J. Beets and Harm van Essen, Hilversum, Netherlands, assignors, by mesne assignments, to Polak & Schwarz International N.V., a corporation of the Netherlands Application June 6, 1955, Serial No. 513,431

Claims priority, application Netherlands July 2, 1954

3 Claims. (Cl. 260—340.2)

The present invention relates to a process of preparing macrocyclic lactones.

Macrocyclic lactones, i.e. cyclic esters of hydroxy carboxylic acids, in which both functional groups are separated by a chain of 10–20 carbon atoms, which may be alternated by hetero atoms, such as oxygen, have great value as odoriferous substances.

In accordance with the present invention, macrocyclic lactones are prepared in very high yields from the easily available polymeric esters of hydroxy carboxylic acids by heating these polymers, preferably in vacuo, in the presence of re-esterification catalysts, such as alkali metal alcoholates, hydroxides or salts and of a high boiling compound which is not or substantially not miscible with the desired cyclic monomer and which is capable of withdrawing this monomer from the reaction mixture by codistillation at the rate at which it is formed. Very efficient examples of such codistillation components are trivalent alcohols such as glycerol and pentane triol-1.2.5.

A suitable manner of preparing polymeric esters is the heating of the hydroxy acid in an inert solvent forming an azeotrope with water or boiling at a sufficiently high temperature to ensure continuous removal of water and, in the presence of an esterification catalyst, in an apparatus rendering continuous removal of reaction water possible. This reaction is continued until the calculated amount of reaction water has been collected and the acid number of the mixture has fallen to or substantially to the value corresponding to the added esterification catalyst.

Mixed polymers may also be prepared in analogous manner by heating the hydroxy acid, together with an arbitrary amount of a high-boiling alcoholic component, e.g. glycerol, in an inert solvent forming an azeotrope with water or boiling at a sufficiently high temperature to ensure continuous removal of water, and in the presence of an esterification catalyst, the formed reaction water being distilled off continuously with the solvent.

Thereupon a quantity of a re-esterification catalyst is added to the solution obtained of the polymer or mixed polymer. For this purpose alcoholates, hydroxides or salts of alkali or earth alkali metals may be used. When the catalyst is alkaline, it may also serve for the neutralisation of the esterification catalyst added for the polymerisation, whereupon the solvent is distilled off and replaced by a high boiling compound which can be used as a codistillation component for the cyclic monomer, e.g. glycerol.

Finally one heats for the depolymerisation of the polymer, preferably in vacuo.

The entire treatment may be carried out in a technically very simple manner in an apparatus which is diagrammatically represented in the annexed figure.

The polymer, together with the re-esterification catalyst and the codistillation component, is brought into a reaction flask 1 surrounded by an electric heating jacket and provided with a capillary and a thermometer and the lateral tube 5 is filled with the codistillation component.

During heating in vacuo the codistillation component distils simultaneously with the cyclic monomer formed through the distillation column 2 and th cooler 3. The distillate is collected in 4, where it is divided into two layers, of which the lower layer, consisting of the codistillation component, recycles continuously to the reaction vessel, via 5, whereas the upper layer, the cyclic monomer, flows continuously to the recipient 6. If necessary, small quantities of the codistillation component may be supplied through the dropping funnel 7 without disturbing the vacuum.

A very simple embodiment, in which the polymerisation and depolymerisation can be carried out without interruption in the same apparatus is obtained when the hydroxy acid is brought into the reaction flask 1 and this is heated, in the presence of the re-esterification catalyst necessary for the following treatment, namely the depolymerisation reaction, e.g. potassium hydroxide in powder form or aqueous solution, and of the codistillation component, until the polymerisation is completed and the reaction water formed has been entirely removed. Hereupon the heating is continued without interruption, the desired macrocyclic lactone being formed under depolymerisation.

The product thus obtained consists practically entirely of the cyclic monomer. It can be freed from a small amount of dimer and other impurities by fractionated distillation.

The method described here enables one to prepare macrocyclic lactones in very high yields.

The invention is elucidated by the following examples.

EXAMPLE 1

*Preparation of 12-oxa-hexadecanolide*

A solution of 570 g. (2.08 mol) of 16-hydroxy-12-oxa-hexadecanoic acid and 3 g. of toluene sulphonic acid are boiled in 624 cm.$^3$ of cumene at a water separator until no water distils over anymore. Duration approximately 1 hour. One cools to approximately 110° C. and adds 12.5 g. of sodium methylate and 72 g. of glycerol.

The cumene is distilled off completely, the apparatus represented in the figure is applied and one heats under a vacuum of 4–5 mm. until no or only a little of oxa-hexadecanolide codistils with glycerol. During the depolymerisation the temperature in the reacting mixture amounts to 188–192° C. The distillate is separated from glycerol, washed with water for the removal of traces of glycerol and distilled. The yield amounts to approximately 80% of the theory.

Boiling point at 3 mm. 150° C.; $n_D^{20}$ 1.4676; $d_4^{20}$ 0.9829.

EXAMPLE 2

*Preparation of 12-oxa-hexadecanolide*

6.32 kg. of 16-hydroxy-12-oxa-hexadecanoic acid with 0.807 kg. of glycerol and 0.129 kg. of 50% potassium hydroxide solution are introduced into the apparatus represented in the figure and one heats in a vacuum of 14–16 mm. whilst gradually increasing the temperature to 180°, until the reaction water has been distilled off substantially entirely. One switches over to high vacuum and continues the heating until the reaction is complete. Hereupon the tube 5 is filled with glycerol and the cyclisation is carried out in accordance with Example 1. The yield amounts to 5.100 kg. of 12-oxa-hexadecanolide or 86.4% of the theory.

EXAMPLE 3

*Preparation of 12-oxa-pentadecanolide*

A solution of 180 g. (0.69 mol) of 15-hydroxy-12-oxa-pentadecanoic acid and 2 g. of toluene sulphonic acid is boiled in 500 cm.³ of cumene until no water separates off anymore. 43 g. of glycerol in which 1.5 g. of Na have been dissolved are added, the cumene is distilled off completely and cyclisation is effected in accordance with Example 1 in a vacuum of 4 mm. During the cyclisation period the temperature of the reaction mixture amounts to 185–195° C.

After separation of the glycerol and fractionation of the reaction product the yield amounts to 81% of the theory.

Boiling point at 4 mm. 144° C.; $n_D^{20}$ 1.4660; $d_4^{20}$ 0.9899. Solidification point 13° C.

EXAMPLE 4

*Preparation of pentadecanolide*

4 kg. of 15-hydroxy pentadecanoic acid with 0.54 kg. of glycerol and 44 g. of potassium hydroxide powder are introduced into the apparatus represented in the figure and one heats whilst polymerising in accordance with Example 2. When the reaction water has been driven out completely the lateral tube 5 is filled with glycerol and cyclisation is effected in accordance with Example 1. By distillation of the reaction product 2996.5 g. of pentadecanolide with solidification point 35.8° or 80.5% of the theory are obtained.

EXAMPLE 5

*Preparation of pentadecanolide*

702 g. (2.72 mols) of 15-hydroxy pentadecanoic acid are polymerized by boiling in an automatic water separator in the presence of 6 g. of toluene sulphonic acid and 1375 cm.³ of cumene. After approximately 1 hour the reaction is complete. One cools to approximately 110° C. and adds 22 g. of sodium methylate and 92 g. of glycerol. The cumene is distilled off completely and depolymerisation is effected in a vacuum of 4–5 mm. until only little or no pentadecanolide codistils with the glycerol. During this period the temperature in the reaction mixture amounts to 195–205° C.

The pentadecanolide is separated in the heat from glycerol, it is washed with water for the removal of traces of glycerol and fractionated in vacuo. Fractions with a starting solidification point of 35° C. or higher are collected. The yield amounts to approximately 80%. By alkaline hydrolysis and recrystallisation alternating amounts of hydroxy pentadecanoic acid may be recovered from the residue of the cyclisation, owing to which the total yield is raised to between 85 and 90%.

EXAMPLE 6

*Preparation of pentadecanolide*

A mixture of:

387 g. (1.5 mols) of 15-hydroxy pentadecanoic acid
92 g. (1 mol) of glycerol
3 g. of toluene sulphonic acid and
500 cm.³ of xylene is boiled in an automatic water separator until the reaction is complete. 13 g. of sodium methylate and 40 g. of glycerol are added and depolymerisation takes place under a vacuum of approximately 4 mm. During the depolymerisation the temperature of the reaction mixture amounts to 190–200° C.

The lower layer consisting of glycerol is separated; one washes with water for the removal of traces of glycerol and fractionates. The yield amounts to 70% of the theory.

EXAMPLE 7

*Preparation of pentadecanolide*

580.5 g. (2.25 mols) of 15-hydroxy pentadecanoic acid are polymerized and cyclisized with the aid of 150 g. of glycerol in which 3 g. of lithium have been dissolved in accordance with one of the Examples 1 or 2. One depolymerizes in vacuo and works up according to one of the preceding examples. The yield amounts to 75% of the theory.

EXAMPLE 8

*Preparation of pentadecanolide*

The polymer of 15-hydroxy-pentadecanoic acid is prepared according to Example 3.

At 100–110° C. a solution of 12.5 g. of calcium in 125 g. of glycerol, prepared by dissolving the metal in methanol, adding glycerol and distilling off the methanol, is added.

One depolymerizes at a temperature of 200–205° C. until no pentadecanolide codistils anymore with glycerol. One works up and fractionates according to Example 3. The yield is lower than when using alkali metal compounds.

EXAMPLE 9

*Preparation of pentadecanolide*

218 g. (0.84 mol) of 15-hydroxy-pentadecanoic acid are converted into the polymer with 100 g. of glycerol and 37 g. of potassium 14-hydroxy tetradecane-1-carboxylate according to Examples 2 and 4. One depolymerizes in vacuo according to one of the preceding examples. After separation of the glycerol and fractionation of the reaction product the yield amounts to 81% of the theory. Melting point 35.2° C.

EXAMPLE 10

*Preparation of pentadecanolide*

258 g. of 15-hydroxy pentadecanoic acid are polymerized in the presence of 516 cm.³ of cumene and 3.5 g. of toluene sulphonic acid according to Example 1. A solution of 6 g. of sodium ethylate in 50 g. of pentane triol-1.2.5 is added. One distils off the cumene completely and cyclisizes according to Example 1. When no or substantially no pentadecanolide codistils anymore with pentane triol the lactone is separated from the triol and distilled. 181 g. of pentadecanolide are obtained. Melting point 35° C. Yield 75% of the theory.

What we claim is:

1. A process for preparing a macrocyclic lactone selected from the group consisting of pentadecanolide, 12-oxa-hexadecanolide and 12-oxa-pentadecanolide, comprising the steps of heating a polymer of a hydroxy carboxylic acid selected from the group consisting of 15-hydroxy pentadecanoic acid, 16-hydroxy-12-oxa-hexadecanoic acid and 15-hydroxy-12-oxa-pentadecanoic acid, in the presence of an alkaline catalyst and a trihydric alcohol selected from the group consisting of glycerol and pentane triol-1.2.5 to depolymerize the polymer, and removing the corresponding lactone from the reaction mixture by codistillation with the trihydric alcohol at the rate at which it is formed.

2. The process of claim 1, wherein the alkaline catalyst is selected from the group consisting of alcoholates, hydroxides and salts of alkali and earth alkali metals.

3. The process of claim 1, wherein the polymer is heated in vacuum.

References Cited in the file of this patent

UNITED STATES PATENTS

| Number | Name | Date |
| --- | --- | --- |
| 2,020,298 | Carothers et al. | Nov. 12, 1935 |
| 2,163,109 | Spanagel | June 20, 1939 |
| 2,234,551 | Collaud | Mar. 11, 1941 |
| 2,417,151 | Collaud | Mar. 11, 1947 |

FOREIGN PATENTS

| Number | Country | Date |
| --- | --- | --- |
| 490,044 | Great Britain | Aug. 4, 1938 |